UNITED STATES PATENT OFFICE.

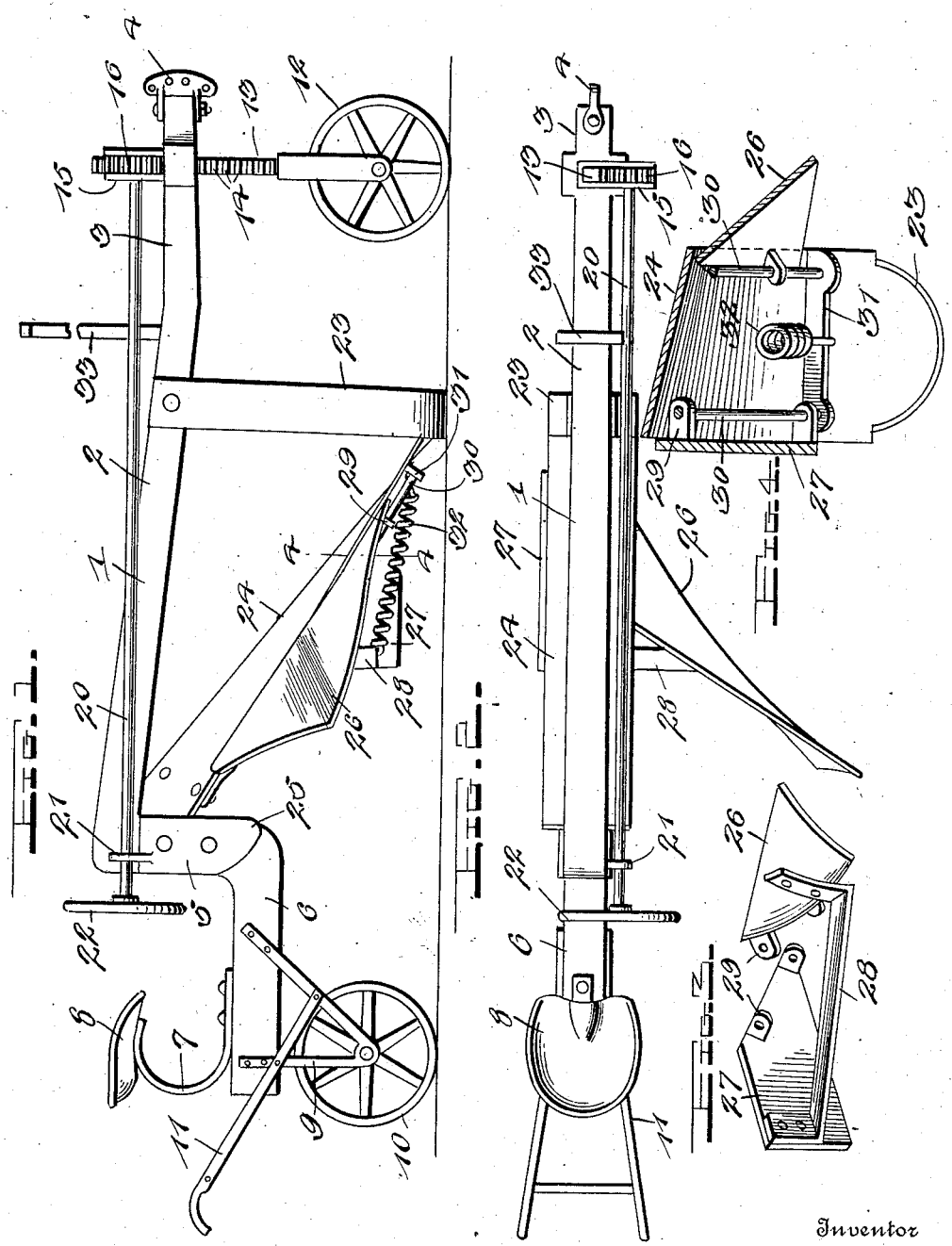

FREDRICK J. WERTELEWSKI, OF GIBSONBURG, OHIO.

DITCHING-MACHINE.

1,048,014.  Specification of Letters Patent.  Patented Dec. 24, 1912.

Application filed May 1, 1912.  Serial No. 694,502.

*To all whom it may concern:*

Be it known that I, FREDRICK J. WERTE-LEWSKI, a citizen of the United States, residing at Gibsonburg, in the county of Sandusky and State of Ohio, have invented certain new and useful Improvements in Ditching-Machines, of which the following is a specification, reference being had to the accompanying drawings.

This invention comprehends certain new and useful improvements in ditching machines, and it has for its primary object a simple, durable and efficient construction of machine of this character in which the soil as it is excavated, is at once turned to one side of the ditch and leveled, and in which the mold board and land side are automatically adjustable. And the invention also aims to generally improve devices of this class and to render them more useful and commercially desirable.

With these and other objects in view as will more fully appear as the description proceeds, the invention consists in certain constructions, arrangements and combinations of the parts that I shall hereinafter fully describe and claim.

For a full understanding of the invention reference is to be had to the following description and accompanying drawings in which—

Figure 1 is a side elevation of a ditching machine embodying the improvements of my invention; Fig. 2 is a top plan view thereof; Fig. 3 is a detail rear perspective view of the mold board and land side and their connections detached from the rest of the machine, and, Fig. 4 is an enlarged detail sectional view, the section being taken on the line 4—4, of Fig. 1.

Corresponding and like parts are referred to in the following description and designated in the views of the accompanying drawings by like reference characters.

The beam 1 of my improved ditching machine embodies an inclined intermediate portion 2 terminating in a substantially horizontal forward end 3 to which a clevis 4 is connected, and terminating at its rear end in a substantially vertically disposed intermediate portion 5 from which a substantially horizontal rear end 6 extends. The seat spring 7 for the driver's seat 8 is mounted on the rear end 6 of the beam 1, as clearly illustrated in the drawings.

Braces 9 are secured to the opposite side faces of the rear end 6 of the beam and extend downwardly therefrom, the joined lower ends of said braces constituting a journal bearing for the axle of a rear ground wheel 10. Rearwardly and upwardly inclined handles 11 are secured to the braces 10, as shown.

12 designates the front ground wheel. This wheel is journaled in a fork formed on the lower end of a vertically disposed standard 13 which extends upwardly through the forward end 3 of the beam and which is formed with rack teeth 14. A guide 15 is provided on the beam for the standard 13, and a pinion 16 is secured to an actuating rod 20 which is journaled at its forward end in said standard guide, the pinion meshing with the rack teeth 14 of the standard. At its rear end, the actuating rod 20 is journaled in a bearing 21 and carries a hand wheel 22 in convenient proximity to the driver's seat 8.

An excavator 23 in the form of a vertically elongated substantially U-shaped loop and preferably composed of a bar having its upper ends riveted or otherwise secured to opposite sides of the main intermediate portion 2 of the beam 1, extends downward in a substantially vertical position in operation and is designed to cut the ditch. A lifter 24 in the form of a longitudinally elongated bar is secured at its forward end to the lower end of the excavator 23, and extends in an inclined direction upwardly and rearwardly from the excavator, the rear upper end of the lifter being secured in any desired way to an angular bracket 25 which is bolted, riveted, or otherwise fastened to the vertical intermediate portion 5 of the beam. Preferably, as clearly illustrated in Fig. 1, the lifter 24 is inclined laterally as well as longitudinally, its land side edge extending above its mold board edge, whereby to assist in turning the soil out of the ditch.

The mold board 26 of my improved ditching machine, which is at the right of the machine facing forward, and the land side 27 which is at the left side of the machine facing forward are connected together by a transversely extending brace bar 28 underneath the lifter 24, said mold board and land side being movable respectively in planes parallel to or coincident with the side edges of the lifter. The mold board and land side are both formed with apertured ears 29 by which they are mounted to move on guide rods 30 which are disposed longitudinally as shown, and which are arranged in parallel relation to each other on the under side of the lifter. The rear ends of the guide rods 30 are secured by any suitable fastening device to the rear upper end of the lifter and the forward ends of said rods are mounted in the apertured ends of a transversely extending rib 31 formed on the lower face of the lifter near the forward end of the latter. A contractile spring 32 is secured at one end to the rib 31 and is secured at its other end to the transversely extending brace bar 28, said spring exerting a tension on the mold board and land side and tending to draw them downwardly and forwardly, in an evident manner.

From the foregoing description in connection with the accompanying drawings, the operation of my improved ditching machine or plow will be apparent. As the machine operates, the excavator will dig into the soil and cut a clean furrow and subsequently a ditch, the soil being lifted and turned to one side, by the combined action of the lifter 24 and mold board 26, whereby the soil will not be merely loosened, but will be carried free from the trench. The land side 27 and mold board 26 will ride on the surface of the ground at one side of the trench or ditch for the purpose of pushing the earth to the side of the trench and far enough away that it will not fall into the same and as the mold board travels on the top of the ground, the higher it will be from the bottom of the excavator as the latter cuts deeper into the ground. For example, on first trip with the excavator set to cut, say, eight inches, the mold board will naturally travel at the surface of the ground pushing back the earth. On the return trip of the excavator cutting eight inches lower, the mold board must then be raised eight inches above the position it held on the first course and so on with the third and subsequent courses. As the ditch is deepened (for it will be understood that several operations will be required according to the depth it is desired the trench shall be when completed) the front ground wheel 12 will be vertically adjusted downward as required, by the operator merely turning the hand wheel 22.

Preferably, there is mounted on the rear upper side of the beam 1 near the forward end thereof an upright guide 33. As several operations along the same trench will be required to complete the ditch, this guiding device will be found useful when the ditch is nearing completion. Being placed directly in front of the operator, he may constantly retain a proper sight on the run of the trench, the machine maintaining itself in upright position. If desired instruments such as used by surveyors or road engineers or the like may be attached to the guide 33 to facilitate the progress of the work.

While the accompanying drawings illustrate what I believe to be the preferred embodiment of my invention, it is to be understood that the invention is not limited thereto, but that various changes may be made in the construction, arrangement and proportions of the parts without departing from the scope of the invention as defined in the appended claims.

Having thus described the invention, I claim:

1. A machine of the character described, including a beam, a ditching excavator secured to said beam and depending therefrom, a lifter connected to the beam and extending upwardly and rearwardly from the excavator, and a mold board projecting laterally from the lifter and movable upwardly and rearwardly from the excavator.

2. A machine of the character described, including a beam, a ditching excavator secured to said beam and depending therefrom, a lifter connected to the beam and extending upwardly and rearwardly from the excavator, and a mold board carried by and projecting laterally from the lifter and tending to automatically move toward the lower end of the latter.

3. A machine of the character described, including a beam, a ditching excavator secured to said beam and depending therefrom, a lifter extending upwardly and rearwardly from the excavator and connected to the beam, a guide rod disposed longitudinally on the lower face of said lifter, a mold board movable longitudinally on said rod and projecting laterally from the lifter, and a spring connected to the mold board and lifter and tending to move the mold board downwardly and forwardly, as specified.

4. A machine of the character described, including a beam, a ditching excavator connected to said beam and depending therefrom, a lifter extending upwardly and rearwardly from the excavator and connected to the beam, rods extending in parallel relation to each other along the lower face of said lifter, means for supporting the rods, and a mold board and land side movable longitudinally on said rods, and automatically movable toward the lower forward end of the lifter.

5. A machine of the character described, including a beam, a ditching excavator connected to said beam and depending therefrom, a lifter extending upwardly and rearwardly from the lower end of the excavator and connected to said beam at the upper end of the lifter, rods secured to the lower face of the lifter and disposed in parallel relation to each other, a land side movable on one of said rods, at one side of said lifter, a mold board movable on the other rod and projecting laterally from the opposite side of the lifter, a transverse brace connecting the mold board to the land side, and a contractile spring connected to the lifter and to said brace and tending to draw the mold board and land side downwardly toward the forward lower end of the lifter.

6. A machine of the character described, including a wheel supported beam with a dropped rear end terminating forwardly in a substantially vertical intermediate portion, an excavator secured to said beam near the forward end thereof and extending downwardly from the beam, a lifter extending upwardly and rearwardly from the lower end of the excavator, and a bracket extending around and secured to the vertical intermediate portion of the beam and connected to the rear upper end of the lifter.

7. A machine of the character described, including a beam, a ditching excavator secured to said beam and depending therefrom, a lifter sloping upwardly and rearwardly from the lower end of the excavator and secured to the beam, and a mold board and land side carried by and projecting laterally from the lifter and tending to automatically move toward the lower end of the latter.

In testimony whereof I hereunto affix my signature in the presence of two witnesses.

FREDRICK J. WERTELEWSKI.

Witnesses:
E. L. TRIFFIT,
I. P. HERNDEN.

---

Copies of this patent may be obtained for five cents each, by addressing the "Commissioner of Patents, Washington, D. C."